May 14, 1968  L. C. SHURTLEFF ET AL  3,382,894
REFRIGERATION VALVE AND METHOD AND APPARATUS FOR MAKING IT
Filed April 11, 1966  3 Sheets-Sheet 1

INVENTORS.
LOUIS CHARLES SHURTLEFF
O O SHURTLEFF
BY
Brown, Critchlow, Flick & Peckham
ATTORNEYS.

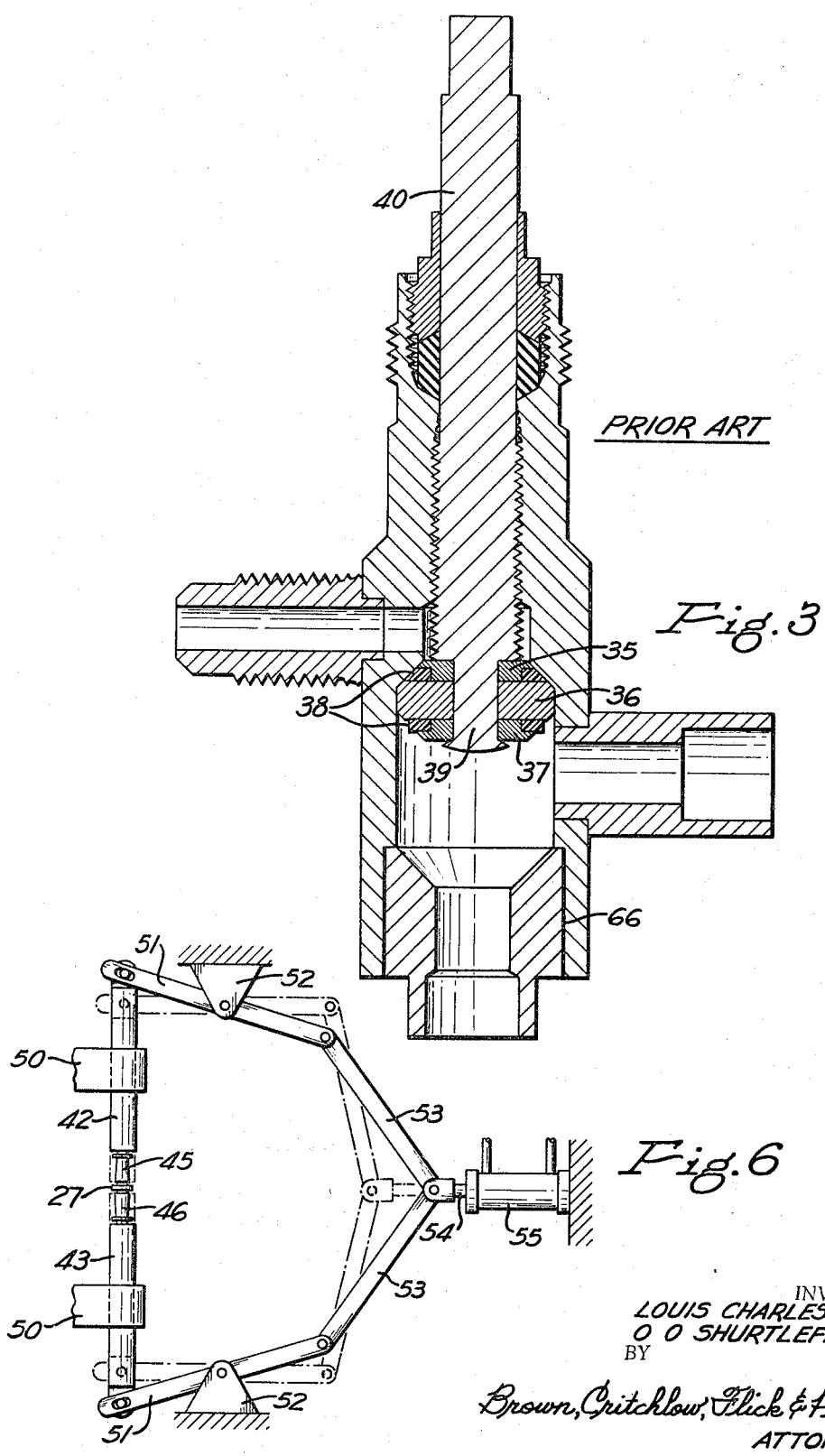

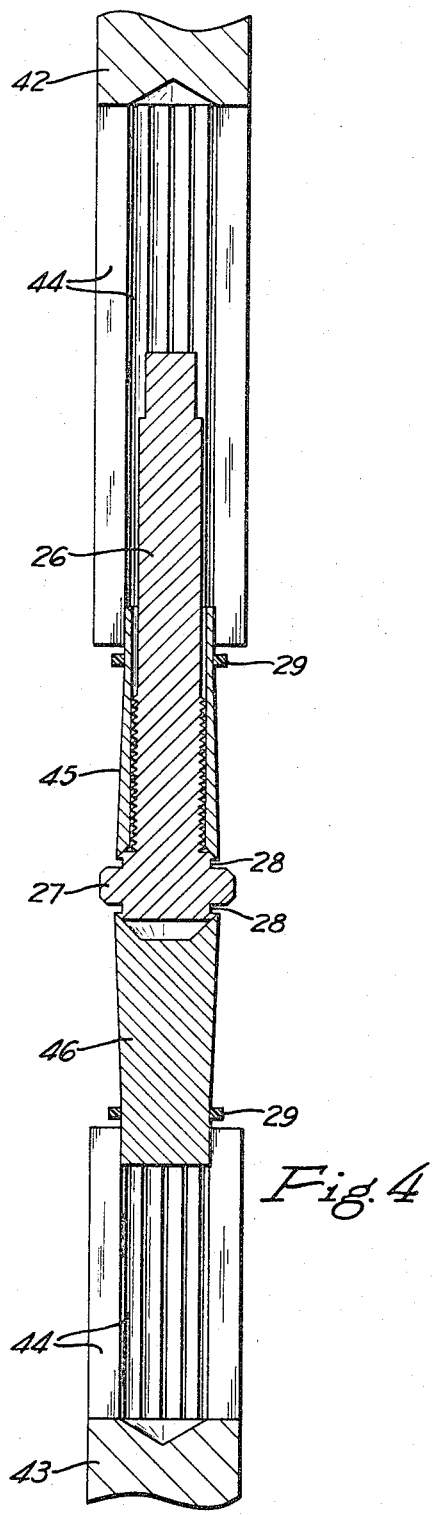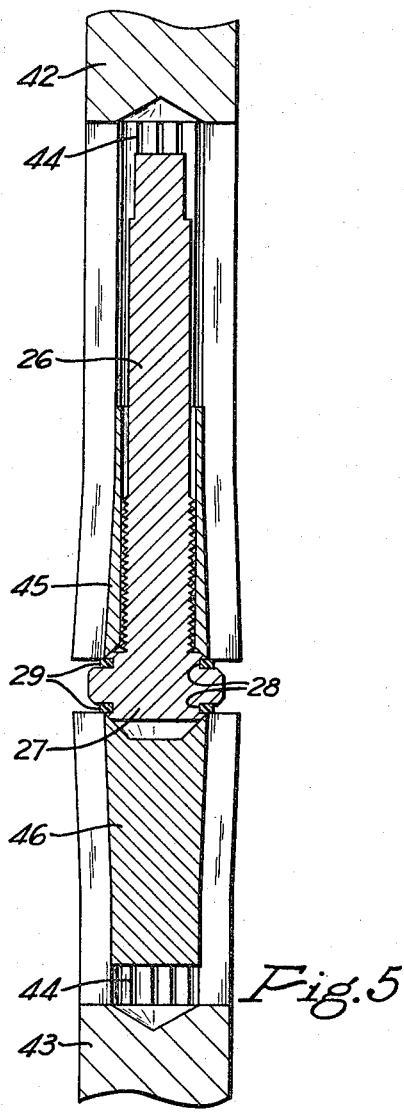

3,382,894
REFRIGERATION VALVE AND METHOD AND APPARATUS FOR MAKING IT
Louis Charles Shurtleff and O O Shurtleff, Austin, Tex., assignors to Chatleff Controls Inc., Austin, Tex., a corporation of Texas
Filed Apr. 11, 1966, Ser. No. 541,687
4 Claims. (Cl. 137—625.5)

This invention relates to valves, and more particularly to service valves for refrigeration systems.

It is common practice to place in the refrigerant-conducting conduits of a refrigeration system one or more valves which, in normal operation of the system, allow the refrigerant to flow through them. They are not necessary for the functioning of the system and may never be touched, but they are in the nature of emergency valves that are used only in case the refrigeration system needs to be serviced. If they are needed only once, their cost is justified. They can be used to check the pressure in the system, to shut off parts of the system while other parts are repaired, and to replace refrigerant that has accidentally been lost from the system. On the other hand, a service valve that leaks while the refrigeration system is open for repairs is doubly expensive, in that the refrigerant that it was meant to save is lost, so the cost of the valve was not justified and the money wasted.

The most generally used service valve for a refrigeration system has a rotatable valve stem made of stainless steel, or machinable steel that has been plated. The head of the stem, which is the closure member, is ground and polished to eliminate all tool marks and surface irregularities. The valve body in which the steel stem is mounted is made of brass or steel and its seats must be perfectly formed. If the valve body is made of steel, grinding and polishing are necessary. In assembling the valve, parts of the body are welded together near a port where later one of the refrigeration conduits is welded to the body. Consequently, the welding material requires a very high temperature so that the purchaser of the valve can weld a conduit to the body without remelting the first weld. The metal-to-metal seating surfaces in such a valve rarely seal effectively. If the valve stem and head are made of machinable steel, they must then be plated to prevent corrosion. The high temperature used in welding the parts of the valve body together often burns the plating and thereby eliminates its protective properties. This eventually allows corrosion and results in a valve that becomes frozen in place and useless.

To overcome these problems it has been proposed that the valve be provided with nonmetallic softer seating surfaces, but this immediately raises two more problems. The most widely used refrigerants today are those which belong to the fluorocarbon group. There is only one nonmetal material accepted by the refrigeration industry that has the desired soft seat characteristic and yet is not attacked by such refrigerants. This material is tetrafluoroethylene resin, which is sold under the trademark Teflon by one of the companies that make it. For the sake of brevity, tetrafluoroethylene resin will be referred to in this specification as Teflon.

The use of Teflon brings about the second problem, which is that it is not easy to work with. Due to its characteristic semi-rigid state and the fact that it yields readily to pressures and deforms without fully returning to its original shape, it has always been thought of as a material which must be pre-cut to exact size and then used without abuse. Consequently, in making a refrigeration service valve with soft seats of Teflon, it has been necessary to assemble the valve stem and head from several parts in order to mount a pair of axially spaced sealing rings of Teflon in annular grooves in the stem head without first expanding the rings. However, such assemblies are undesirable because they are expensive to make and they do not offer great strength. That is, in use, the force applied to the valve stem in pressing the rings against their seats may loosen the head assembly. Furthermore, such an assembly does not lend itself to accuracy because each part of it carries its own chance for error and even may be bent during assembly. There also is an additional objection to such a valve, which is that Teflon will not stand high temperatures and therefore must be protected from the heat of the high temperature weld that joins the parts of the valve body together. Such a weld is made at temperatures between 1400 and 1600° F., while the temperature of the Teflon sealing rings must not exceed 500° F. It is very difficult to protect the rings from the destructive high temperatures.

It is among the objects of this invention to provide a refrigeration service valve which has soft seats, which is strong and durable, which is easy and inexpensive to assemble, and in which the parts of the valve body can be welded together at lower temperatures than heretofore. Other objects are to provide apparatus for inserting tetrafluoroethylene resin sealing rings in a valve closure without stretching the rings out of shape permanently.

In accordance with this invention, the service valve has a tubular body provided with an axial port in its front end and a side port behind the end port. The inside of the body is enlarged between these two ports to form a valve chamber having front and rear valve seats facing each other between the ports. A rotatable valve stem is threaded in the tubular body behind the rear valve seat and projects from the rear end of the body. Joined to the front end of the stem is a one-piece head disposed in the valve chamber and having a pair of axially spaced annular grooves therein provided with inner and outer radial side walls connected by circular inner end walls. Teflon sealing rings are mounted in the groove in engagement with their inner end walls, with the rings projecting radially from the grooves. The valve body also has a second side port that opens into the valve chamber between the front and rear positions of the stem head. In order to assemble the sealing rings with the stem head, the rings are disposed in axial alignment with the head and then are moved axially suddenly at high speed toward said grooves and are simultaneously expanded sufficiently to pass over the outer walls of the grooves. Immediately after they pass over these outer walls the rings are allowed to contract into the grooves, which they will do. This manner of assembling the rings with the head is made possible by our discovery that if the Teflon rings are expanded by subjecting them to sudden pressure or shock only momentarily, such as by an impact, they will return to their original size. If they are expanded more slowly, they will yield and not return to their original size.

The invention is illustrated in the accompanying drawings, in which

FIG. 3 is a longitudinal section through a refrigeration service valve of the prior art;

FIG. 4 is a longitudinal section through apparatus for assembling the sealing rings with the valve closure;

FIG. 5 is a similar view showing the rings just after they have snapped into the grooves in the closure; and FIG. 6 is a reduced fragmentary side view of said apparatus with its actuating means.

Figure 1:
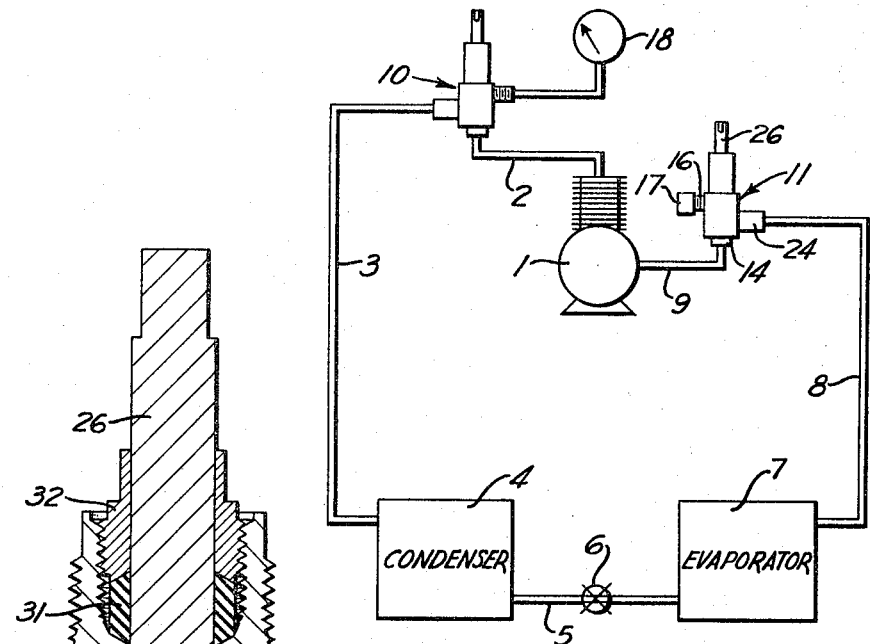
FIG. 1 is a diagram of a refrigeration system containing two service valves.

Referring to FIG. 1 of the drawings, a compressor 1 pumps refrigerant of the fluorocarbon compound type, such as $$CF_3CH_3, CF_3CCl_3, CF_3CFCl_2, CF_3ClCCl_3,$$
$$CCl_2F_2, CCl_2F_2/CH_3CHF_2, CHClF_2, \text{ or}$$
$$CHClF_2/CClF_2CF_3$$

through high pressure conduits 2 and 3 to a condenser 4 where heat is removed. The refrigerant then passes through a conduit 5 provided with an expansion device 6 so that the refrigerant enters the evaporator 7 at a very low temperature. From the evaporator the compressor withdraws the refrigerant through low pressure conduits 8 and 9. A service valve 10 is shown joined to the high pressure conduits 2 and 3, and another service valve 11 is shown joined to the low pressure conduits 8 and 9. Since the two service valves are alike, only valve 11 will be described.

Figure 2:
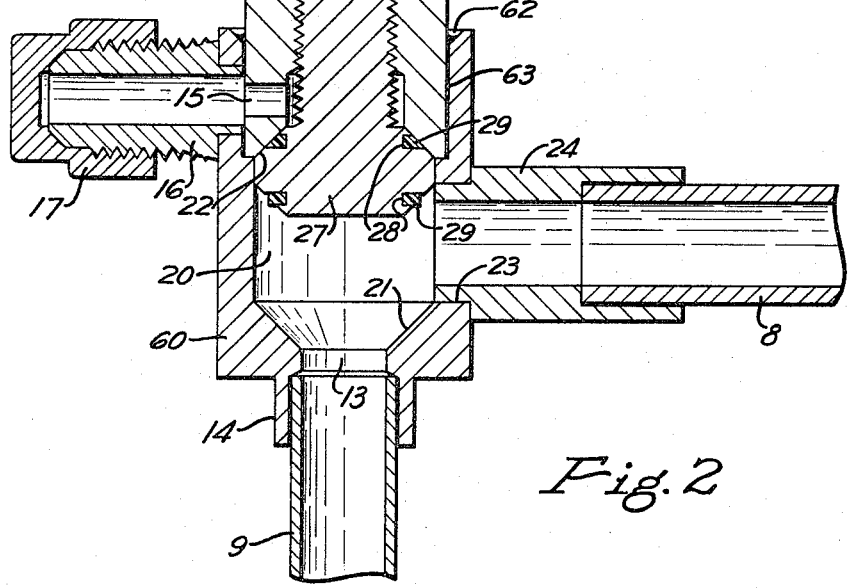
FIG. 2 is a longitudinal section through our refrigeration service valve.

As shown in FIG. 2, the service valve has a tubular body provided at its front or lower end with an axial port 13, from which an integral collar 14 projects. One end of conduit 9 is welded in this collar. Behind the end port the body of the valve is provided with a side port 15, from which a coupling 16 projects. A cap 17 is shown screwed onto this coupling to seal this port, but the cap can be removed to permit refrigerant to be added to the system through the coupling. With valve 10, the cap can be replaced by a pressure gauge 18 if desired.

The inside of the valve body between the ports just described is enlarged to form a valve chamber 20 having at its front and rear ends tapered valve seats 21 and 22 that face each other between the two ports. The valve body also has a second side port 23 that opens into the valve chamber substantially midway between the two valve seats. A coupling 24 is rigidly mounted in this port and has an outer end in which conduit 8 is welded.

Threaded in the tubular body of the valve behind the rear valve seat is a rotatable valve stem 26 that projects from the rear end of the body and is provided with flats to permit it to be turned. Joined to the front end of the valve stem, preferably integrally, is a one-piece head 27 that is disposed in the valve chamber and forms the closure member. The head has a pair of axially spaced annular grooves 28 in it provided with inner and outer radial side walls connected by circular inner end walls. Mounted in these grooves are sealing rings 29 made of tetrafluoroethylene resin. It will be observed that the rings engage the circular inner end walls of the grooves and project from the grooves far enough to make good sealing contact with the valve seats. One of the rings engages the rear valve seat 22 when the stem head is moved to the back of the valve chamber as shown in FIG. 2, which is the normal operating position for the valve. The other ring is engageable with the front valve seat 21 to close the end port 13 when the head is moved forward in the chamber. A packing gland 31 in a recess in the rear end of the valve body is pressed tightly against the valve stem by a nut 32 screwed into the recess, whereby leakage rearwardly along the stem is prevented.

It is a feature of this invention that although the stem head 27 is made in one piece with the grooves 28 cut into it, the sealing rings fill the grooves in spite of the fact that they are made of tetrafluoroethylene resin. Heretofore, this had been considered to be impossible, due to the rings not contracting appreciably after they had been stretched far enough to pass over the outer side walls of the grooves in order to enter the grooves. In other words, the rings yielded and remain permanently stretched. The reason that our sealing rings of Teflon engage the circular inner end walls of the grooves in the one-piece head is that in assembling the rings with the head the rings were expanded by the shock of sudden pressure applied only for an instant like an impact, and during that instant they were slipped over the outer side walls of the grooves and released. We discovered that such shock or impact stretching of the rings for less than a second would not permanently deform them. Instead, they returned to their original size as soon as the expanding pressure was removed, thereby behaving like elastic rings. As fas as we know, this is the first time that Teflon sealing rings have fit snugly in grooves in a one-piece valve closure, so such a construction is an important feature of this invention. Before this invention, as mentioned above, Teflon sealing rings were not stretched into place because, due to the time involved in expanding them, they yielded and would not contract after being expanded. Therefore, the valve closure had to be assembled from several separate parts 35, 36 and 37 as shown in FIG. 3, and the sealing rings 38 were fitted in the recesses in parts 35 and 37 before part 36 was placed between them. Then the reduced inner end 39 of a valve stem 40 was inserted in this assembly and headed over to hold the various parts together.

In order to subject the sealing rings 29 to sudden pressure for an instant to expand them only momentarily in accordance with the present invention, apparatus such as shown in FIGS. 4, 5 and 6 may be used. This apparatus includes a pair of expansible mandrels 42 and 43 that are axially aligned, with their inner ends spaced apart. The expansible portion of each mandrel is tubular and is provided with a plurality of longitudinally extending, circumferentially spaced slits 44. Between the mandrels there is a pair of rigid conical members 45 and 46. Each of these members normally has only its small end disposed in the inner end of one of the mandrels, as shown in FIG. 4. Preferably, the smaller end portions of the conical members are cylindrical and are tightly gripped by the end of the mandrels. Conical member 45 is hollow for snugly receiving the valve stem 26, with its head 27 located between the adjacent large ends of the conical members which engage its opposite sides. The large ends of the conical members are recessed to receive the adjoining sides of the valve stem head for a short distance to help keep the conical members and head aligned. The edge of the large end of each conical member has a diameter substantially the same as the outer diameter of the outer side wall of the adjacent groove 28 in the stem head. The small ends of the conical members are of a size to receive and preferably be snugly engaged by the two sealing rings 29 close to the adjoining mandrels.

Suitable means are provided for moving the mandrels toward each other extremely rapidly. When this is done, the mandrels push the two sealing rings toward each other, the mandrels expanding and sliding along the flaring surfaces of the conical members as shown in FIG. 5. As the sealing rings are pushed toward the stem head, they are compelled by the conical members to expand. Since this axial movement of the rings toward each other takes only an instant, it is the same as if the rings had been subjected to a sudden, momentarily applied expanded shock or impact. The movement of the mandrels toward each other stops just as they push the rings off the large ends of the conical members and around the grooves. At the moment the expanding force disappears and the rings snap into the encircled grooves and contract into engagement with their circular inner end walls. If desired, the rings may be formed with inner diameters slightly less than the inner diameters of the grooves, so that when the rings contract into the grooves they will tightly grip the inner end walls of the grooves.

One way of moving the two mandrels toward each other very rapidly is illustrated in FIG. 6. The mandrels are shown slidably mounted in two fixed supports 50, with the outer ends of the mandrels pivotally connected to one end of levers 51, the central portions of which are pivotally mounted in stationary supports 52. The opposite end of these levers are pivotally connected to the outer ends of toggle links 53, the inner ends of which are pivoted to a piston rod 54 that extends into a fluid pressure cylinder 55. When fluid under pressure is suddenly admitted to the right-hand end of this cylinder, the toggle is straightened, which causes the levers to rock and force the mandrels toward each other.

A further feature of this invention is that the tubular body of the service valve is formed from two parts, a front portion 60 and a rear portion 61, which are welded together in a location so remote from collar 14 that there is no danger of the heat that later is applied in welding conduit 9 in the collar affecting the weld between the two parts of the valve body. Accordingly, the front portion of the valve body is provided at its rear end with a socket 62 that is located behind the side port 23 but is provided with the outer part of side port 15 in its side wall. The front end of the rear portion of the valve body fits in this socket and is welded therein. This weld is so far from collar 14 that a relatively low temperature (e.g., 600 to 800° F.) welding material 63 can be used without being affected by the heat used later in welding conduit 9 in collar 14. The temperature required for the welding material 63 is so low that there is little danger of the heat affecting the Teflon sealing rings in the valve stem head, which at that time would be moved forward against seat 21. If it is felt that there is any chance of the welding heat damaging the sealing rings, they can be protected much more easily than they could be protected from the high temperatures previously required in welding the parts of a valve body together, where the weld 66 in question was at the front end of the valve body as shown in FIG. 3. Our construction of the valve body also makes it convenient to form the rear valve seat 22 on the front end of the rear portion 61 of the body.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A refrigeration valve comprising a tubular body having an axial port in its front end and a side port behind the end port, the inside of said body being enlarged between said ports to form a valve chamber having front and rear valve seats facing each other between the ports, a rotatable valve stem threaded in the tubular body behind the rear valve seat and projecting from the rear end of the body, a one-piece head in said chamber joined to the front end of said stem and having a pair of axially spaced annular grooves therein with inner and outer radial side walls connected by circular inner end walls, and tetrafluoroethylene resin sealing rings mounted in said grooves in engagement with said inner end walls and projecting radially from the grooves, one of said rings being engageable with the rear valve seat to close said side port when the stem head is moved to the back of said chamber, and the other ring being engageable with the front valve seat to close said end port when said head is moved forward in the chamber, said body having a second side port opening into said chamber between the front and rear positions of the stem head.

2. A refrigeration valve according to claim 1, in which said tubular valve body comprises axially aligned front and rear portions, the rear end of the front portion behind said last-mentioned side port being provided with an axial socket receiving the front end of the rear portion, and a weld in said socket securing said body portions together.

3. A refrigeration valve according to claim 2, in which the front end of said valve body rear portion forms said rear valve seat.

4. The combination with a refrigeration system having conduits containing fluorocarbon refrigerant, of a service valve comprising a tubular body having front and rear portions with an axial port in its front end, said body around said port being welded to one end of one of said conduits, the body having a side port behind said end port, the inside of said body being enlarged between said ports to form a valve chamber having front and rear valve seats facing each other between the ports, said front portion of the body having a side port opening into said chamber between the valve seats, a coupling fastened in said last-mentioned port and projecting laterally therefrom, the coupling being welded to one end of another of said conduits, the rear end of said front portion of the tubular body behind said last-mentioned port being provided with an axial socket receiving the front end of said rear portion, a weld in said socket securing said body portions together, a rotatable valve stem threaded in said rear portion of the body and projecting from the rear end thereof, a head in said chamber joined to the front end of said stem and having a pair of axially spaced annular grooves therein with inner and outer radial side walls connected by circular inner end walls, and tetrafluoroethylene resin sealing rings mounted in said grooves in engagement with said inner end walls and projecting radially from the grooves, one of said rings being engageable with the rear valve seat to close said first-mentioned side port when the stem head is moved to the back of said chamber, and the other ring being engageable with the front valve seat to close said end port when said head is moved forward in the chamber.

References Cited

UNITED STATES PATENTS

| | | | |
|---|---|---|---|
| 2,862,736 | 12/1958 | Russell | 277—188 X |
| 2,877,070 | 3/1959 | Lee | 277—165 |
| 3,166,097 | 1/1965 | Hinderer et al. | |

M. CARY NELSON, *Primary Examiner.*

J. R. DWELLE, *Assistant Examiner.*